US011682296B2

(12) United States Patent
Akella et al.

(10) Patent No.: US 11,682,296 B2
(45) Date of Patent: Jun. 20, 2023

(54) PLANNING ACCOMMODATIONS FOR REVERSING VEHICLES

(71) Applicant: Zoox, Inc., Foster City, CA (US)

(72) Inventors: Abishek Krishna Akella, Pleasanton, CA (US); Mahsa Ghafarianzadeh, Emerald Hills, CA (US); Kenneth Michael Siebert, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 209 days.

(21) Appl. No.: 16/456,987

(22) Filed: Jun. 28, 2019

(65) Prior Publication Data

US 2020/0410853 A1   Dec. 31, 2020

(51) Int. Cl.
| | |
|---|---|
| *G08G 1/04* | (2006.01) |
| *B60W 30/09* | (2012.01) |
| *G05D 1/00* | (2006.01) |
| *G05D 1/02* | (2020.01) |
| *G08G 1/01* | (2006.01) |
| *G08G 1/09* | (2006.01) |

(52) U.S. Cl.
CPC ............. *G08G 1/04* (2013.01); *B60W 30/09* (2013.01); *G05D 1/0055* (2013.01); *G05D 1/021* (2013.01); *G08G 1/0112* (2013.01); *G08G 1/0125* (2013.01); *G08G 1/093* (2013.01)

(58) Field of Classification Search
CPC ................................ G08G 1/04; B60W 30/09
See application file for complete search history.

(56) References Cited

U.S. PATENT DOCUMENTS

| | | | |
|---|---|---|---|
| 2017/0217361 A1* | 8/2017 | Miller | ................... B66F 17/003 |
| 2019/0101924 A1* | 4/2019 | Styler | .................. G05D 1/0088 |
| 2019/0315274 A1* | 10/2019 | Mehdi | .................. G06V 20/584 |
| 2019/0392308 A1* | 12/2019 | Bhatnagar | ................ G06N 3/08 |

(Continued)

FOREIGN PATENT DOCUMENTS

DE       102017211044 A1 *   6/2017   ............ B60W 30/08

OTHER PUBLICATIONS

The PCT Search Report and Written Opinion dated Oct. 29, 2020 for PCT Application No. PCT/US2020/039784, 16 pages.

(Continued)

*Primary Examiner* — Jess Whittington
(74) *Attorney, Agent, or Firm* — Lee & Hayes, P.C.

(57) ABSTRACT

Techniques for determining that a first vehicle is associated with a reverse state, and controlling a second vehicle based on the reverse state, are described herein. In some examples, the first vehicle may provide an indication that the first vehicle will be executing a reverse maneuver, such as with reverse lights on the vehicle or by positioning at an angle relative to a road or parking space to allow for the reverse maneuver into a desired location. A planning system of the second vehicle (such as an autonomous vehicle) may receive sensor data and determine a variety of these indications to determine a probability that the vehicle is going to execute a reverse maneuver. The second vehicle can further determine a likely trajectory of the reverse maneuver and can provide appropriate accommodations (e.g., time and/or space) to allow the second vehicle to execute the maneuver safely and efficiently.

21 Claims, 5 Drawing Sheets

(56) References Cited

U.S. PATENT DOCUMENTS

| | | | |
|---|---|---|---|
| 2020/0013292 A1* | 1/2020 | Switkes | G08G 1/166 |
| 2020/0135032 A1* | 4/2020 | Switkes | G05D 1/0293 |
| 2020/0175869 A1* | 6/2020 | Khoo | G08G 1/147 |
| 2020/0324768 A1* | 10/2020 | Switkes | B60W 30/162 |
| 2021/0341304 A1* | 11/2021 | Kunii | B60Q 1/50 |

OTHER PUBLICATIONS

"Strassenverkehrszulassungsordnung 52a Ruckfahrscheinwerfer", retrieved on Oct. 6, 2020 at «http://WWW.verkehrsportal.de/stvzo/stvzo_52a.php», 2 pages.
Wikipedia, "Ruckfahrscheinwerfer", retrieved on Oct. 6, 2020 from «https://de.wikipedia.org/wiki/R%C3%BCckfahrscheinwerfer», 3 pages.
The International Preliminary Report on Patentability dated Jan. 6, 2022 for PCT Application No. PCT/US2020/039784, 8 pages.

* cited by examiner

PLANNING ACCOMMODATIONS FOR REVERSING VEHICLES

BACKGROUND

Various methods, apparatuses, and systems are utilized to guide autonomous vehicles through environments including various static and dynamic objects. For instance, autonomous vehicles utilize route planning methods, apparatuses, and systems to guide autonomous vehicles through congested areas with other moving and stationary vehicles (autonomous or otherwise), people, buildings, and other objects. In some examples, an autonomous vehicle may make decisions while traversing an environment to ensure safety for passengers and surrounding persons and objects. However, predicting a behavior of other vehicle or objects in an environment may present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features, in accordance with examples of the disclosure.

DETAILED DESCRIPTION

Figure 1:
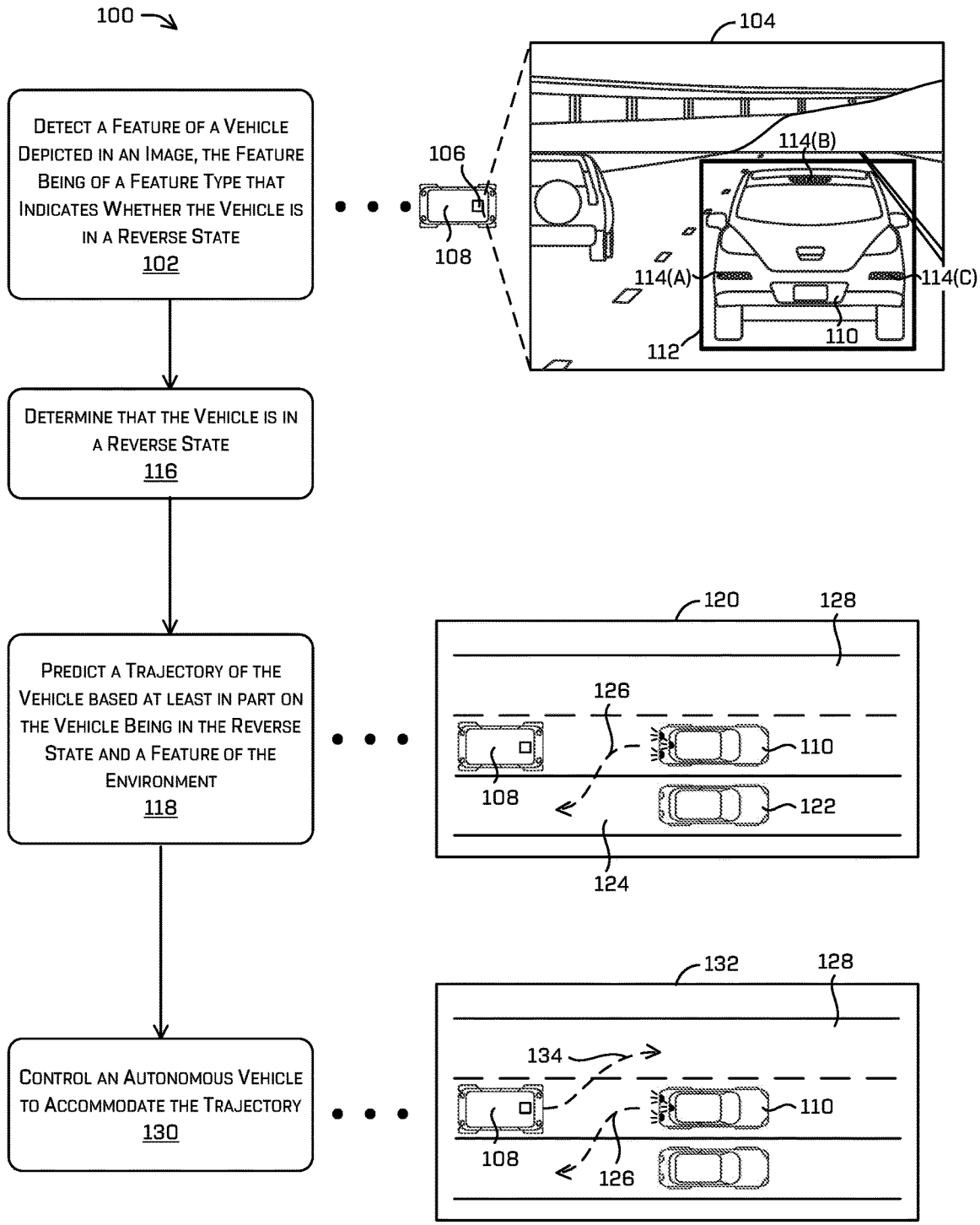
FIG. 1 is a pictorial flow diagram for controlling an autonomous vehicle based on a predicted trajectory of a vehicle determined to be associated with a reverse state, in accordance with examples of the disclosure.

This disclosure relates to techniques for determining that a vehicle is likely to perform a maneuver in a reverse state, and accommodating these maneuvers by controlling an autonomous vehicle in a safe and efficient manner. In some examples, a vehicle may provide an indication that the vehicle will be executing a reverse maneuver, such as with reverse lights on the vehicle, and/or by positioning at an angle relative to a road or parking space to allow for the reverse maneuver into a desired location. A planning system of the autonomous vehicle may use sensor data to determine a variety of these indications to subsequently determine a probability that the vehicle is going to execute a reverse maneuver, determine a likely trajectory of the reverse maneuver, and provide appropriate accommodations (e.g., time and/or space) to the vehicle to execute the maneuver safely and efficiently.

Sensor data captured by the autonomous vehicle can include data captured by an image sensor, such as individual images, video, and the like, as well as data captured by other sensors such as lidar sensors, radar sensors, time-of-flight sensors, sonar sensors, and the like. In some cases, the sensor data can be provided to a perception system configured to determine or classify a type of an object (e.g., vehicle, pedestrian, bicycle, motorcycle, animal, parked car, tree, building, and the like) in the environment.

The sensor data may be captured by the autonomous vehicle as the autonomous vehicle traverses an environment. In some examples, the autonomous vehicle may include, among other sensors, one or more cameras configured to capture images (e.g., individual images and/or video) of the surrounding environment. Images captured by the one or more cameras may be analyzed to detect objects, either independently of or in conjunction with the detection of the objects by the other sensors of the vehicle. Once detected, in some examples, the images may be cropped to an area of interest surrounding the objects, e.g., based on size (centimeters, pixels, etc.) surrounding individual objects, based on a bounding box surrounding the object, and so forth.

In examples, a trajectory determination component of the autonomous vehicle may identify an object such as a vehicle in an image, along with detecting a feature of the vehicle. For instance, the trajectory determination component may segment the image to detect lights of the vehicle which may be capable of indicating that the vehicle is in a reverse state. In some cases, a light that indicates that the vehicle is associated with a reverse state may be occluded in the image. In such a case, the trajectory determination component may identify another light (e.g., a different reverse-indicator light, a brake light, and so forth) to determine a state associated with the vehicle (e.g., a forward state, a reverse state, etc.), and/or may use additional context related to the vehicle to determine if the vehicle is associated with a reverse state.

In some examples, the trajectory determination component may then use the image depicting the feature to determine whether the light is indicating that the vehicle is associated with a reverse state, such as by inputting a portion of the image depicting the feature into a machine-learned model trained to predict vehicle behavior based at least in part on a characteristic of the feature. In some examples, a vehicle associated with a reverse state may also be referred to as a vehicle in a reverse gear, although it may be understood that a vehicle does not necessarily need a physical reverse gear to be "in a reverse gear." For example, a vehicle may comprise an electric motor and may provide thrust in a reverse direction by changing a polarity of a voltage to reverse a direction of a motor.

Specifically, the machine-learned model may determine that reverse lights of a vehicle are on, and may predict behavior of the vehicle based on the reverse lights being on. Additionally, the machine-learned model may receive a variety of features of the environment that may provide additional information as to whether the vehicle is in a reverse state, in a non-reverse state, or in an "intending to reverse state," in which the vehicle is not yet reversing, but is likely to perform a reverse maneuver imminently (e.g., within 3 seconds, 5 seconds, one block, 3 blocks, 25 feet, 50 feet, etc.). In some examples, features of the environment that may provide clues as to whether the vehicle is in a reverse state (or is planning on entering a reverse state) may include an orientation of the vehicle (e.g., relative to a lane of traffic), a velocity of the vehicle relative to a speed limit at a location of the vehicle in the environment, a velocity of the vehicle relative to other vehicles in the surrounding environment, a particular lane that the vehicle is currently in, a lane neighboring the lane that the vehicle is currently in (e.g., a neighboring parking lane, driveway, etc.), whether the vehicle is located at or near a junction, distances between the vehicle and other vehicles in the environment, velocities of other vehicles near the vehicle, and so forth. Features of the environment may be collected from different sensor modalities to provide the trajectory determination component with information about the environment to use in predicting behavior of the other vehicle.

The machine-learned model may output an indication that the vehicle is in a reverse state in response to the reverse lights of the vehicle being on, along with an analysis of the features of the environment surrounding the vehicle. In some examples, the machine-learned model may be a classifier that outputs an indication corresponding to the vehicle being in a reverse state, the vehicle being in a non-reverse state, or the vehicle being in an intending to reverse state. Alternatively, the machine-learned model may output a binary indication of whether the vehicle is in a reverse state or a non-reverse state. Other examples are also considered, such as outputting a predicted trajectory for the vehicle based on the determination of the state of the vehicle.

For instance, the trajectory determination component may predict a trajectory of the vehicle based at least in part on the indication of the reverse state of the vehicle, and/or the features of the environment as described above. In some examples, features of the environment may be used to determine a path, or trajectory, that the vehicle may follow once the vehicle begins executing a maneuver in the reverse gear. For example, the trajectory determination component may determine multiple possible trajectories for the vehicle based on the features of the environment surrounding the vehicle and/or the reverse indication. In some cases, the trajectory determination component may select a most likely trajectory (or several most likely trajectories) from the multiple trajectories, and plan a trajectory for the autonomous vehicle to follow based on the most likely predicted trajectory/trajectories for the vehicle to accommodate the anticipated reverse maneuver.

For instance, the trajectory determination component may predict the trajectory by generating, using the machine-learned model described above or another machine-learned model, a top-down image comprising channels that include information associated with features of the environment such as traffic lanes, map data, objects in the environment, and the like. The machine-learned model used to generate the predicted trajectory may output coordinates (e.g., x-coordinates and y-coordinates) associated with the vehicle at one or more times in the future (e.g., 1 second, 2 seconds, 3 seconds, etc.). In some examples, the machine-learned model can output coordinates associated with the vehicle as well as probability information associated with each coordinate. Further, the machine learning model can output a heat map associated with prediction probabilities. In some examples, at least one predicted trajectory can be determined based at least in part on the heat map. Additional details regarding predicting trajectories using a top-down approach can be found in U.S. patent application Ser. No. 16/151,607, which is incorporated by reference herein in its entirety. Other approaches to predict a trajectory for a vehicle determined to be in a reverse state (or an intending to reverse state) are also considered, such as a prediction that the vehicle will proceed in reverse at an observed velocity of the vehicle for a predetermined amount of time (e.g., 1 second, 2 seconds, 3 seconds, etc.) until the reverse state is determined to have changed.

In some examples, the trajectory determination component may control the autonomous vehicle to maintain a current position (e.g., by stopping the autonomous vehicle) or control the autonomous vehicle to follow a trajectory that continues along a route to an intended destination of the autonomous vehicle but circumvents the predicted trajectory of the vehicle executing the reverse maneuver. In addition to these examples, the trajectory determination component may control the autonomous vehicle to reverse to provide additional space for the predicted trajectory of the vehicle executing the reverse maneuver.

As an illustration of a specific example, consider a vehicle that is preparing to parallel park from a lane of traffic next to a lane of parking spaces. An autonomous vehicle may be traveling in the lane of traffic behind the vehicle, and detect that the vehicle has its reverse lights on (and/or other contextual information, such as wheel direction, etc.) in preparation to execute the parallel parking maneuver. The autonomous vehicle may determine one or more predicted trajectories that the vehicle may follow to execute the parallel parking maneuver (e.g., a successful first attempt at the parallel parking maneuver, and a trajectory that may cause the vehicle to unsuccessfully execute the parallel parking maneuver and start over by re-entering the lane of traffic). The autonomous vehicle may evaluate an angle of the vehicle relative to the lane of traffic and/or the parking lane, along with locations of parked vehicles, to determine the predicted trajectory, for instance. Then, in a first example, the autonomous vehicle may be controlled to wait for the vehicle to execute the maneuver by stopping in the lane of traffic at a position that allows the vehicle to execute the parallel parking maneuver (e.g., behind the parking space which the vehicle is entering).

In another example, the autonomous vehicle may be controlled to enter a different lane of traffic opposite the parking lane to circumvent the predicted trajectory of the parallel parking maneuver, by entering the different lane of traffic at a position behind the parking space the vehicle is entering, for instance.

The techniques discussed herein can improve a functioning of a computing device in a number of ways. For instance, the trajectory determination component may use as few as a single image (or a cropped portion of a single image) to make reliable determinations of reverse maneuvers of vehicles in the environment. Consequently, significantly less processing resources are used in comparison to conventional techniques that require complex image analysis algorithms applied to multiple images or video, and/or data supplied by other sensors to determine reverse behavior of a vehicle. Since the reverse indication can be determined from a single image, the trajectory determination component may be able to determine trajectories for more vehicles in reverse, and/or other vehicles or objects in the environment in general, than would be possible if multiple images or video were required. In some cases, the described techniques are more accurate than other reverse determination mechanisms. For example, determinations on whether a vehicle is in reverse may be inaccurate if the reverse lights are occluded by other objects in the environment, the reverse lights of the vehicle are burnt out or otherwise not operational and/or are completely occluded, or the vehicle has not yet entered a reverse gear to display illuminated reverse lights. These determinations may be improved by using additional information in the surrounding environment and other information about the vehicle itself (e.g., an angle relative to a lane of traffic or parking lane) described herein.

By controlling the vehicle based in part on determinations on whether other vehicles are in a reverse gear using both indications supplied by other vehicles and information gathered about the surrounding environment, the safety of the vehicle can be improved by determining that other vehicles are in reverse faster and earlier, thus allowing the vehicle to make trajectory decisions earlier that provide accommodations for reverse maneuvers by other vehicles. Additionally, as just described, controlling the vehicle based in part on determining a reverse maneuver by another vehicle can reduce processing resources, with as few as a single image being evaluated by the processing resources at one time during the reverse determination.

Further, techniques for controlling the vehicle based in part on determining a reverse maneuver by another vehicle can increase a confidence that the vehicle can avoid collisions with oncoming traffic and/or pedestrians by determining the reverse maneuver earlier and with greater accuracy, which may improve safety outcomes, performance, and/or accuracy. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, the techniques described herein may be utilized in driver-controlled vehicles in which such a system may provide an indication to a driver of the vehicle of whether it is safe to perform various maneuvers. In another example, the techniques can be utilized in an aviation or nautical context, or in any system involving objects or entities that may be associated with behavior that is unknown to the system. Such techniques may also be used, for example, in the context of manufacturing and assembly to inspect components as they move down an assembly line. Additionally, the techniques described herein can be used with real data (e.g., captured using sensor(s)), simulated data (e.g., generated by a simulator), or any combination of the two.

FIG. 1 is a pictorial flow diagram 100 for controlling an autonomous vehicle based on a predicted trajectory of a vehicle determined to be in a reverse gear, in accordance with examples of the disclosure.

An operation 102 includes detecting a feature of a vehicle depicted in an image, the feature being of a feature type that indicates whether the vehicle is in a reverse gear. For instance, the feature type may be lights of the vehicle that indicate that the vehicle is in a reverse gear, a sound output by the vehicle that the vehicle is in a reverse gear, and so forth. In some cases, although the vehicle may be depicted in the image, the feature itself may not be depicted (e.g., when the feature is occluded or the feature is a sound (e.g., a back-up beeper, a back-up alarm, or a vehicle motion alarm)), although the described process may nonetheless continue to determine a predicted trajectory of the vehicle based on other information as described above and below.

In an example, an image 104 may be captured by an image sensor 106 of an autonomous vehicle 108 as the autonomous vehicle traverses an environment. The image 104 may depict a vehicle 110 that is traversing the environment as well. In some cases, the image 104 may be cropped around the vehicle 110, generating a cropped image 112 which may be used to detect one or more features of the vehicle 110. In this case, the autonomous vehicle 108 may detect features 114(A), 114(B), and 114(C) (collectively features 114), corresponding to lights of the vehicle 110 that may indicate that the vehicle 110 is in a reverse gear, that the vehicle 110 is braking, blinkers to indicate that the vehicle 110 intends to turn left or right, hazard lights of the vehicle 110, and so forth.

Other features are also considered, such as wheel angle, detection of a double-parked vehicle (e.g., a third vehicle in the environment), and so forth. Along with the features 114, additional information about the environment may also be detected using the image sensor 106 and/or other sensors of the autonomous vehicle 108. As described above and in more detail below, features of the environment that may provide information as to whether the vehicle 110 is in a reverse gear (or is planning on entering a reverse gear, also referred to as an "intending to reverse state") may include an orientation of the vehicle (e.g., relative to a lane of traffic), a velocity of the vehicle 110 relative to a speed limit at a location of the vehicle 110 in the environment, a velocity of the vehicle 110 relative to other vehicles in the surrounding environment, a particular lane that the vehicle 110 is currently in, a lane neighboring the lane that the vehicle 110 is currently in (e.g., a neighboring parking lane, driveway, etc.), whether the vehicle 110 is located at or near a junction, distances between the vehicle 110 and other vehicles in the environment, velocities of other vehicles near the vehicle 110, and so forth. The vehicle 110 and/or the features 114 may be detected, for instance, using a semantic segmentation algorithm trained to identify objects and features of objects, although other examples of detecting the vehicle 110 and the features 114 are also considered. Additional details regarding determinations of vehicle lighting states may be found in U.S. patent application Ser. No. 15/982,658, which is incorporated by reference herein in its entirety.

An operation 116 includes determining that the vehicle is in a reverse state. For instance, a machine-learned model (or multiple models) may be used to determine whether a vehicle is in a reverse gear. In some examples, the feature detected in operation 102 (and/or additional features of the environment surrounding the vehicle 110, sensor data captured or received in the operation 102 with or without detected features, and the like) may be input into a machine-learned model trained to predict vehicle behavior based, at least in part, on the feature type of a particular feature. Continuing with the above example, the cropped image 112 may be input into a machine-learned model trained to predict that a vehicle will perform a reverse maneuver based on reverse lights of the vehicle being on (e.g., illuminated). The machine-learned model, in some cases, may be a classifier trained to classify a reversing state of the vehicle 110 into one or more of a reverse state, a non-reverse state, or an intending to reverse state, to name a few classification examples. Additional details regarding a machine-learned model that may be used to determine that a vehicle is in a reverse gear can be found in the discussions of FIGS. 2 and 4.

An operation 118 includes predicting a trajectory of the vehicle based at least in part on the vehicle being in the reverse state and a feature of the environment. For instance, consider an example 120 in which the vehicle 110 has been determined to be in a reverse gear. The autonomous vehicle 108 may identify various features of the environment, such as a vehicle 122 and a parking lane 124, which may be relevant to generating a predicted trajectory 126 of the vehicle 110. For example, the autonomous vehicle 108 may determine that the vehicle 110 is likely to enter the parking lane 124 while progressing around the vehicle 122, in order to park in the parking lane 124 rather than continue reversing straight or reversing into a traffic lane 128. In examples, the features of the environment may be determined from map data of the environment (e.g., traffic lanes, parking lanes, junctions, sidewalks, etc.), may be determined from image data or other sensor data that represents objects in the environment (e.g., cars, pedestrians, bicycles, construction zones, etc.), and so forth. The features of the environment may be used to determine the predicted trajectory based on objects that the vehicle 110 is likely to avoid or circumvent, such as other vehicles, sidewalks, pedestrians, and so on, while also determining objects that the vehicle 110 is likely to pass through or enter, such as parking spaces, driveways, particular lanes of traffic (e.g., in performing a three-point turn), loading docks, or even to connect with vehicle attachments such as trailers. For instance, a top-down approach may be used to generate heat maps associated with prediction probabilities of objects in an environment, which in turn may be used to determine a predicted trajectory for the vehicle 110, as discussed herein. Additional details of predicting a trajectory are discussed in connection with FIG. 2, and throughout this disclosure.

An operation 130 includes controlling an autonomous vehicle to accommodate the trajectory. An example 132 illustrates the autonomous vehicle 108 determining a trajectory 134 that accommodates the predicted trajectory 126 (e.g., the output of operation 118) of the vehicle 110, based on the determination that the vehicle 110 is in a reverse gear. The trajectory 134 of the autonomous vehicle 108 includes maneuvering into the traffic lane 128 while providing the vehicle 110 with space to continue executing the reverse maneuver predicted by the predicted trajectory 126. In some examples, to provide adequate space to accommodate the trajectory predicted 126 of the vehicle 110, the autonomous vehicle 108 may also determine a width of the vehicle 110, and generate the trajectory 134 based on a width of the vehicle 110 applied to a length of the predicted trajectory 126. The trajectory 134 may also include a buffer extended beyond the width of the vehicle 110 along the predicted trajectory 126 (e.g., an additional 20 percent of the width of the vehicle 110) which provides additional space for slight variations in an actual trajectory that the vehicle 110 may follow and/or may instill confidence by a driver of the vehicle 110 that the autonomous vehicle 108 will not collide with the vehicle 110. In this way, the autonomous vehicle 108 may accommodate the predicted trajectory 126 of the vehicle 110 that includes a reverse maneuver safely and effectively, while providing the autonomous vehicle 108 with a mechanism to continue to a desired destination with fewer interruptions than were present in previous techniques.

Figure 2:
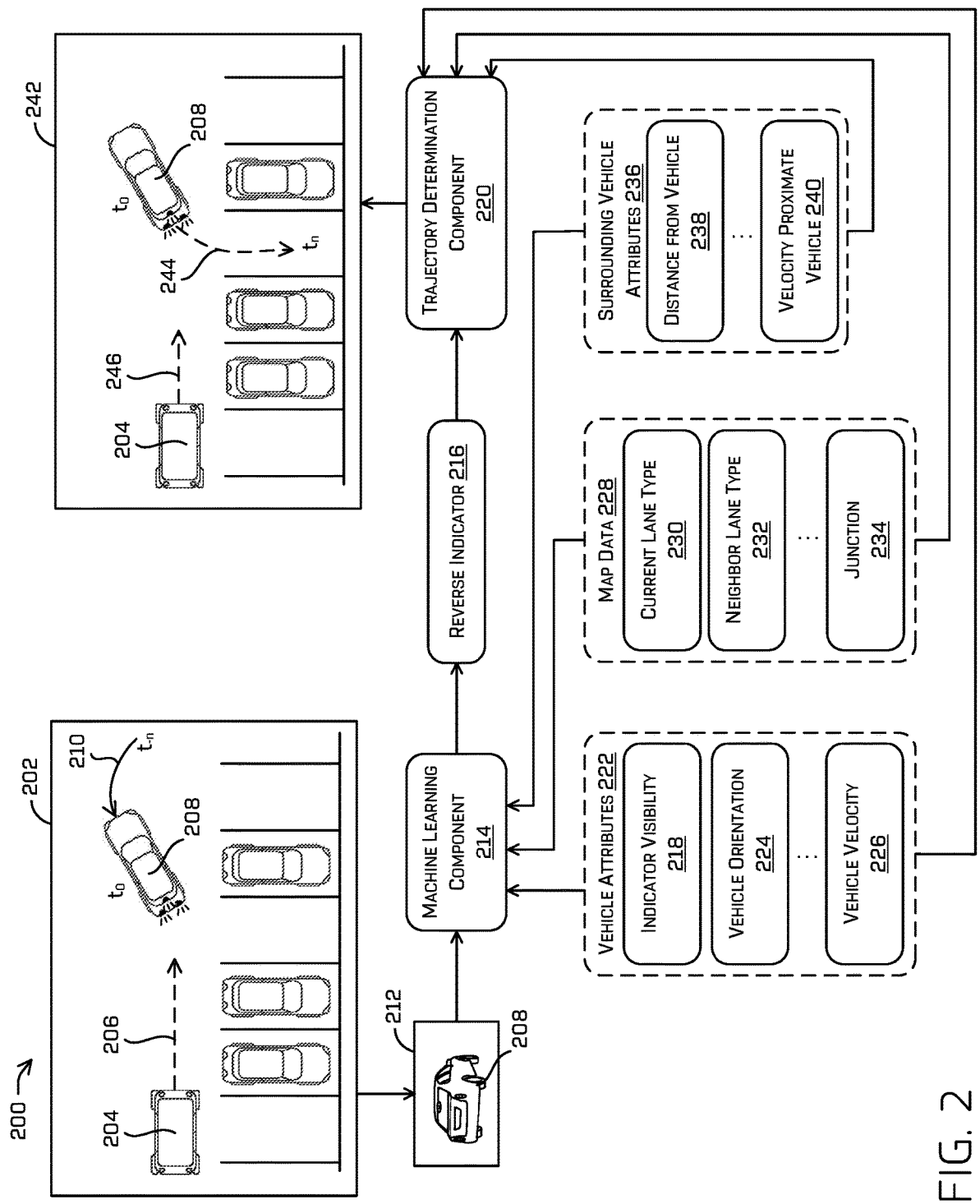
FIG. 2 is an illustration of a system that may be used to determine one or more trajectories based, in part, on an indication of a vehicle being associated with a reverse state, in accordance with examples of the disclosure.

FIG. 2 is an illustration of a system 200 which may be used to determine one or more trajectories based, in part, on an indication of a vehicle being in a reverse gear, in accordance with examples of the disclosure.

A first example 202 illustrates a scenario in which an autonomous vehicle 204 is proceeding along a trajectory 206 through an environment. A vehicle 208 is also included in the example 202, pictured at a location at a time $t_0$. A trajectory 210 of the vehicle 208 is shown from a time $t_{-n}$ to the time $t_0$ (e.g., in the past), which represents a maneuver that the vehicle 208 has executed leading up to the time to. In some examples, the time from $t_{-n}$ to $t_0$ may correspond to an amount of time that the vehicle 208 is tracked to provide information about behavior of the vehicle 208, such as 1 second, 3 seconds, 5 seconds, 10 frames of a video, 30 frames of a video, and so forth. In the context of a top-down prediction implementation, operations may include inputting data representing the environment over time (e.g., data representing then environment at T=−2.0 seconds, t=−1.5 seconds, t=−1.0 second, t=−0.5 seconds. At the time $t_0$, the autonomous vehicle 204 may capture an image 212 (or other data) of the vehicle 208. The image 212 may be used to determine how to control the autonomous vehicle 204 to continue proceeding after the time $t_0$, such as based on a predicted trajectory of the vehicle 208.

The image 212, in some instances, may be a cropped image based on a bounding box associated with the vehicle 208. For example, the bounding box can be generated by a classifier, a detector, or a segmenter, which can identify objects (such as vehicles) in image data. While an image is used in the described example associated with the system 200, other indicators may be associated with a vehicle that may provide an indication to the surrounding environment of the vehicle's behavior and relied upon for making determinations about the vehicle, such as other types of visual signals (e.g., hand signals, display screens, etc.), auditory signals, and so forth as may be determined by any combination of sensor data or other signals.

To predict a trajectory for the vehicle 208, the autonomous vehicle 204 may input the image 212 (or other indicator, sensor data, signals, data (e.g., map data), etc.) into a machine learning component 214, which in turn can output a reverse indicator 216 corresponding to an indication as to whether the vehicle 208 is in a reverse gear. In some examples, the machine learning component 214 may output a probability associated with the vehicle 208 being in reverse, such as based on the lighting state of the lights of the vehicle 208. Alternatively or in addition, the machine learning component 214 may output a classification of multiple classifications corresponding to possible reverse indications, such as that the vehicle 208 is in a reverse state, the vehicle 208 is in a non-reverse state, and/or the vehicle 208 is in an intending to reverse state. While generally described in relation to a classifier that outputs the reverse indication 216 into the reverse state, the non-reverse state, and/or the intending to reverse state, the machine learning component may alternatively output a binary indication of whether the vehicle is reversing or not reversing as well.

The machine learning component 214 may also receive features of the environment that may be used to determine behavior of the vehicle 208, including determining the reverse indicator 216. The features of the environment may be received from sensors of the autonomous vehicle 204 and/or map data associated with the environment surrounding the autonomous vehicle 204 and the vehicle 208. For instance, the machine learning component 214 may receive vehicle attributes 222 associated with the vehicle 208. The vehicle attributes 222 may include, for example, an indicator visibility 218, which may indicate whether indicators of the vehicle 208 being in the reverse gear (e.g., lights) are visible or not. In some cases, if the indicator visibility 218 indicates that the lights of the vehicle 208 are occluded, not operational, or not depicted in the image 212, other features may be relied upon more heavily (e.g., weighted higher) in making a prediction of a future trajectory for the vehicle 208.

The vehicle attributes 222 may also include a vehicle orientation 224 of the vehicle 208. The vehicle orientation 224 may be determined from the image 212, for instance, and may be based on an angle of the vehicle 208 relative to a lane of traffic that the vehicle 208 is in and/or a neighboring lane to the lane of traffic that the vehicle 208 is in, such as a parking lane or another lane of traffic. In some cases, if the vehicle 208 is positioned at an angle other than generally parallel to a direction of travel of the lane of traffic, the machine learning component 214 may use this information to predict a reverse state of the vehicle 208.

Additionally, the vehicle attributes 222 may include a vehicle velocity 226 associated with the vehicle 208. The vehicle velocity 226 may be determined, for example, based at least in part on lidar data, radar data, time of flight data, image data, or other techniques for determining velocity of objects in an environment. The machine learning component 214 may compare the vehicle velocity 226 to one or more of a speed limit for the environment or velocities of other vehicles in the environment to determine a likelihood that the vehicle 208 is executing a reverse maneuver or is planning on executing a reverse maneuver. In many cases, vehicles executing reverse maneuvers proceed at velocities much lower than a permitted speed limit for a drivable region. Additionally, vehicles intending to execute a reverse maneuver (e.g., looking for a parking space to back into) also typically move at lower speeds than a permitted speed limit and/or other vehicles in an environment. Therefore, the machine learning component 214 may leverage the vehicle velocity 226 to determine whether the vehicle 208 is executing a reverse maneuver, and/or whether the vehicle 208 is intending to execute a reverse maneuver, and output a reverse state for the vehicle 208 accordingly. Additional vehicle attributes 222 are also considered.

Additionally, the machine learning component 214 may receive map data 228 associated with the environment surrounding the autonomous vehicle 204 and the vehicle 208. For example, the map data 228 may include a current lane type 230, a neighbor lane type 232, and/or an indication of a junction 234. The current lane type 230 may indicate a current lane or lanes that the vehicle 208 is occupying. For example, the vehicle 208 may be occupying a driveway as a current lane type 230. The machine learning component 214 may use the current lane type 230 to determine a predicted trajectory associated with the vehicle 208 backing out of the driveway, for instance. The neighbor lane type 232 may indicate lanes proximate to the current lane that the vehicle 208 is occupying, such as a parking lane, other traffic lanes, and so forth. In examples, the machine learning component 214 may use the neighbor lane type 232 to predict the reverse state of the vehicle 208 such as during a parallel parking maneuver, a backing into a perpendicular parking space maneuver, a three-point turn maneuver, and so on. The indication of the junction 234 may indicate junctions proximate the vehicle 208, which the machine learning component 214 may use to predict the reverse state of the vehicle 208 for maneuvers such as backing around a corner. Additional map data 228 may also be used by the machine learning component 214 for predicting a reverse state for the vehicle 208.

Further, the machine learning component 214 may receive surrounding vehicle attributes 236, which may correspond to information related to vehicles other than the autonomous vehicle 204 and the vehicle 208, and how the other vehicles are reacting to the maneuver being performed by the vehicle 208 at time $t_0$. The surrounding vehicle attributes 236 may include, for example, a distance 238 from the vehicle 208, and/or a velocity 240 proximate the vehicle 208. The distance 238 and/or the velocity 240 may be determined based at least in part on lidar data, radar data, time of flight data, image data, or other data or techniques for determining relative distances or velocities of objects in an environment.

In many cases, other vehicles may provide the vehicle 208 with additional space when the other vehicles (or drivers of the other vehicles) anticipate that the vehicle 208 may be making a reverse maneuver. Therefore, the machine learning component 214 may determine that other vehicles are providing additional distance 238 between themselves and the vehicle 208, and may use this information to predict whether the vehicle 208 is executing, or is intending to execute, a reverse maneuver. Similarly, in many cases, other vehicles may proceed at slower velocities (e.g., to wait for the vehicle to complete the reverse maneuver) or faster velocities (e.g., to proceed before the vehicle executes an anticipated reverse maneuver) when the other vehicles anticipate that the vehicle 208 may be making a reverse maneuver. Therefore, the machine learning component 214 may determine that other vehicles are proceeding at a different velocity 240 proximate the vehicle 208, and may use this information to predict whether the vehicle 208 is executing, or is intending to execute, a reverse maneuver. Additional surrounding vehicle attributes 236 may also be used by the machine learning component 214 for predicting a reverse state for the vehicle 208.

The vehicle attributes 222, the map data 228, and/or the surrounding vehicle attributes 236 may be leveraged in a variety of ways by the machine learning component 214 to output the reverse indicator 216. For example, the machine learning component 214 may utilize data fusion approaches, such as by applying a Kalman filter or by using a convolutional neural network, to combine data received from multiple sensor modalities related to the vehicle attributes 222, the map data 228, and/or the surrounding vehicle attributes 236. The machine learning component 214 may, in addition, utilize a classifier to select from the reverse state, the non-reverse state, and/or the intending to reverse state to generate the reverse indicator 216 based on information received from a data fusion layer of the machine learning component 214.

The reverse indicator 216 as determined using any of the image 212, the vehicle attributes 222, the map data 228, and/or the surrounding vehicle attributes 236 may be output to a trajectory determination component 220, which may use the reverse indicator 216 to predict a future trajectory for the vehicle 208, and may adjust the trajectory 206 of the autonomous vehicle 204 based on the predicted trajectory for the vehicle 208. In some examples, the trajectory determination component 220 may also receive the features of the environment including the vehicle attributes 222, the map data 228, and/or the surrounding vehicle attributes 236, which may be used to refine a predicted trajectory of the vehicle 208, and/or be used to adjust the trajectory 206. The features of the environment may be received from sensors of the autonomous vehicle 204 and/or map data associated with the environment surrounding the autonomous vehicle 204 and the vehicle 208.

In some examples, the trajectory determination component 220 may combine the input received from the reverse indicator 216, the vehicle attributes 222, the map data 228, and/or the surrounding vehicle attributes 236 to predict a trajectory for the vehicle 208, such as by using a weighted average of different environmental attributes in conjunction with the reverse indicator 216. In some examples, the input received from the reverse indicator 216, the vehicle attributes 222, the map data 228, and/or the surrounding vehicle attributes 236 may be combined using one or more data fusion approaches, such as by applying a Kalman filter or by using a convolutional neural network, to generate a predicted trajectory for the vehicle 208. For instance, the map data 228 may be combined with the vehicle attributes 222 and/or the surrounding vehicle attributes 236 to determine candidate parking locations (or other reverse maneuver possibility locations), and use a physics-based model to determine a likelihood that the vehicle 208 is backing into a parking space of the candidate parking locations.

In another example, the image 212, the vehicle attributes 222, the map data 228, and/or the surrounding vehicle attributes 236 may be input into a machine-learned model that outputs a heat map indicating possible trajectories of the vehicle 208. As described above, the trajectory determination component 220 may predict the trajectory by generating, using a machine-learned model, a top-down image comprising channels that include information associated with the features of the environment such as vehicle attributes 222, the map data 228, the surrounding vehicle attributes 236, and the like. The machine-learned model used to generate the predicted trajectory may output coordinates (e.g., x-coordinates and y-coordinates) associated with the vehicle 208 at a time $t_n$ corresponding to one or more times in the future (e.g., 1 second, 2 seconds, 3 seconds, etc.). In some examples, the machine-learned model of the trajectory determination component 220 can output coordinates associated with the vehicle 208 as well as probability information associated with each coordinate. Further, the machine-learned model can output a heat map associated with prediction probabilities. In some examples, at least one predicted trajectory can be determined based at least in part on the heat map. Additional details regarding predicting trajectories using a top-down approach can be found in U.S. patent application Ser. No. 16/151,607, which is incorporated by reference herein in its entirety. Other approaches to predict a trajectory for the vehicle 208 determined to be in a reverse state (or an intending to reverse state) are also considered, such as a prediction that the vehicle will proceed in reverse at an observed velocity of the vehicle for a predetermined amount of time (e.g., 0.5 seconds, 1 second, 2 seconds, 3 seconds, etc.) until the reverse state is determined to have changed. Other examples are also considered.

An example 242 corresponds to the same time ($t_0$) as the example 202, but in this case depicts a predicted trajectory 244 of the vehicle 208 based on the inputs to the trajectory determination component 220 of the vehicle 208. In this case, the reverse indicator 216 may be based on a determination that the vehicle 208 is in a reverse gear(e.g., based on the lighting state of the reverse lights of the vehicle 208 being on), and/or additional features of the environment as described above.

The trajectory determination component 220 may also leverage features of the environment to generate the predicted trajectory 244, such as the location of perpendicular parking spaces proximate a current lane that the vehicle is occupying that the vehicle 208 may back into, an orientation of the vehicle 208 relative to the current lane(s) that the vehicle 208 is occupying and/or the parking lane, the velocity of the vehicle 208 from the time $t_{-n}$ to the time $t_0$, and distances and/or velocities of other vehicles in the surrounding environment relative to the vehicle 208. The predicted trajectory 244 may correspond to a time $t_n$ in the future, such as 1 second, 3 seconds, 5 seconds, and so forth. In some examples, the trajectory determination component 220 may also alter the trajectory 206 of the autonomous vehicle 204 based on the predicted trajectory 244 to a trajectory 246, such as to slow down and wait for the vehicle 208 until the time $t_n$, allowing the vehicle 208 to complete the reverse maneuver indicated by the predicted trajectory 244.

Figure 3:
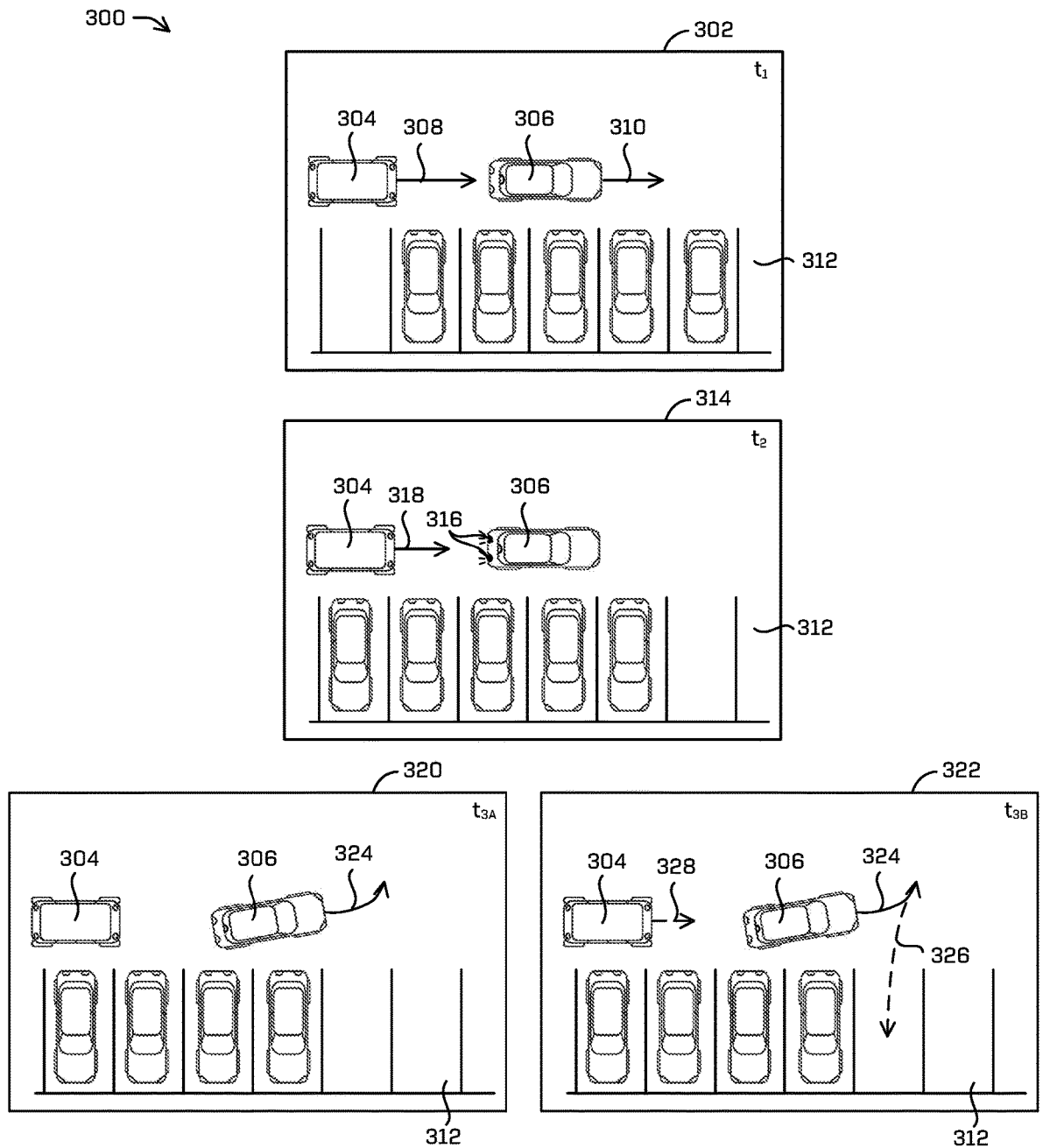
FIG. 3 is an illustration of using environmental features for determining an intending to reverse state, and a subsequent trajectory estimate for a vehicle, in accordance with examples of the disclosure.

FIG. 3 is an illustration 300 of using environmental features for determining an intending to reverse state, and a subsequent trajectory estimate for a vehicle, in accordance with examples of the disclosure.

An example 302 depicts an autonomous vehicle 304 and a vehicle 306 traversing an environment at a time $t_1$. The autonomous vehicle 304 may be traversing the environment along a trajectory 308, which may be in accordance with following the vehicle 306 as the vehicle 306 traverses the environment along a trajectory 310. In the example 302, the autonomous vehicle 304 and the vehicle 306 may be passing a parking lane 312 that includes vehicles in various parking spaces of the parking lane 312.

An example 314 depicts the autonomous vehicle 304 and the vehicle 306 at a time $t_2$ after the time $t_1$, still adjacent the parking lane 312. The autonomous vehicle 304 and the vehicle 306 have progressed along the parking lane 312 from the time $t_1$ to the time $t_2$. At the time $t_2$, however, the vehicle 306 may apply brakes to slow down, causing brake lights 316 of the vehicle 306 to illuminate. In response to detecting the brake lights 316 of the vehicle 306 illuminating, the autonomous vehicle 304 may alter the trajectory 308 to a trajectory 318, in which the autonomous vehicle 304 slows down and/or stops to avoid a collision with the vehicle 306.

Although the vehicle 306 has not provided an indication that the vehicle 306 is currently in a reverse gear at the time $t_2$, the autonomous vehicle 304 may utilize other information to determine that the vehicle 306 is more likely to execute a reverse maneuver (e.g., in an intending to reverse state), and accommodate an anticipated reverse maneuver by providing time and/or space to the vehicle 306. For example, at the time $t_2$, the autonomous vehicle 304 may analyze a speed of the vehicle 306 (e.g., relative to a speed limit of the environment and/or other vehicles in the environment), map data indicating a proximity of the vehicle 306 to the parking lane 312, and/or image data indicating individual parking spaces of the parking lane 312 that may be unoccupied, and increase a likelihood that the vehicle 306 may imminently execute a reverse maneuver, despite the vehicle 306 not currently indicating being in a reverse gear.

For instance, an example 320 and an example 322 depict the autonomous vehicle 304 and the vehicle 306 at a time $t_3$, where the example 320 corresponds to a time $t_{3A}$, and the example 322 corresponds to a time $t_{3B}$ (e.g., generally a same time, although two examples are depicted for illustrative purposes). In the example 320, the vehicle 306 progresses along a trajectory 324, in which the vehicle 306 begins to turn away from the parking lane 312. The autonomous vehicle 304 may combine the observation of the trajectory 324 of the vehicle 306 with map data associated with the parking lane 312, and/or image data indicating individual parking spaces of the parking lane 312 that may be unoccupied, and increase the likelihood that the vehicle 306 is going to execute a reverse maneuver. In some examples, the autonomous vehicle 304 may also detect (e.g., from image data or map data) that there is no space for the vehicle 306 to make a forward-direction, left-hand turn at the current location of the vehicle 306, which may increase the likelihood that the vehicle 306 is going to execute a reverse maneuver. The increased likelihood that the vehicle 306 is going to execute a reverse maneuver may cause the vehicle 306 to be labeled as being in an intending to reverse state.

In the example 322, the autonomous vehicle 304 may generate a predicted trajectory 326 based on the observations of the behavior of the vehicle 306 and/or the features of the environment surrounding the vehicle 306, and according to a determination that the vehicle 306 is in an intending to reverse state. The predicted trajectory 326 may correspond to a reverse maneuver to be executed by the vehicle 306 to enter a particular space in the parking lane 312. Based on the predicted trajectory 326, the autonomous vehicle 304 may alter the trajectory 318 that the autonomous vehicle 304 was following at the time $t_2$ to a trajectory 328, which can accommodate the reverse maneuver of the predicted trajectory 326.

In some examples, the trajectory 328 may cause the autonomous vehicle 304 to slow down, maintain a position (e.g., stop), and/or circumvent the predicted trajectory 326. In examples, the autonomous vehicle 304 continues to evaluate the behavior of the vehicle 306 after the time $t_3$ to determine a likelihood that the vehicle 306 will, in fact, execute the reverse maneuver. The likelihood that the vehicle 306 will execute the reverse maneuver may be increased in response to lights of the vehicle 306 that indicate a reverse state being illuminated, as discussed in relation to FIG. 2 for instance. In some cases, identification of the vehicle 306 being in a reverse state, such as by the reverse lights being illuminated, may cause the autonomous vehicle 304 to change a label associated with the vehicle 306 from an intending to reverse state to a reverse state.

Figure 4:
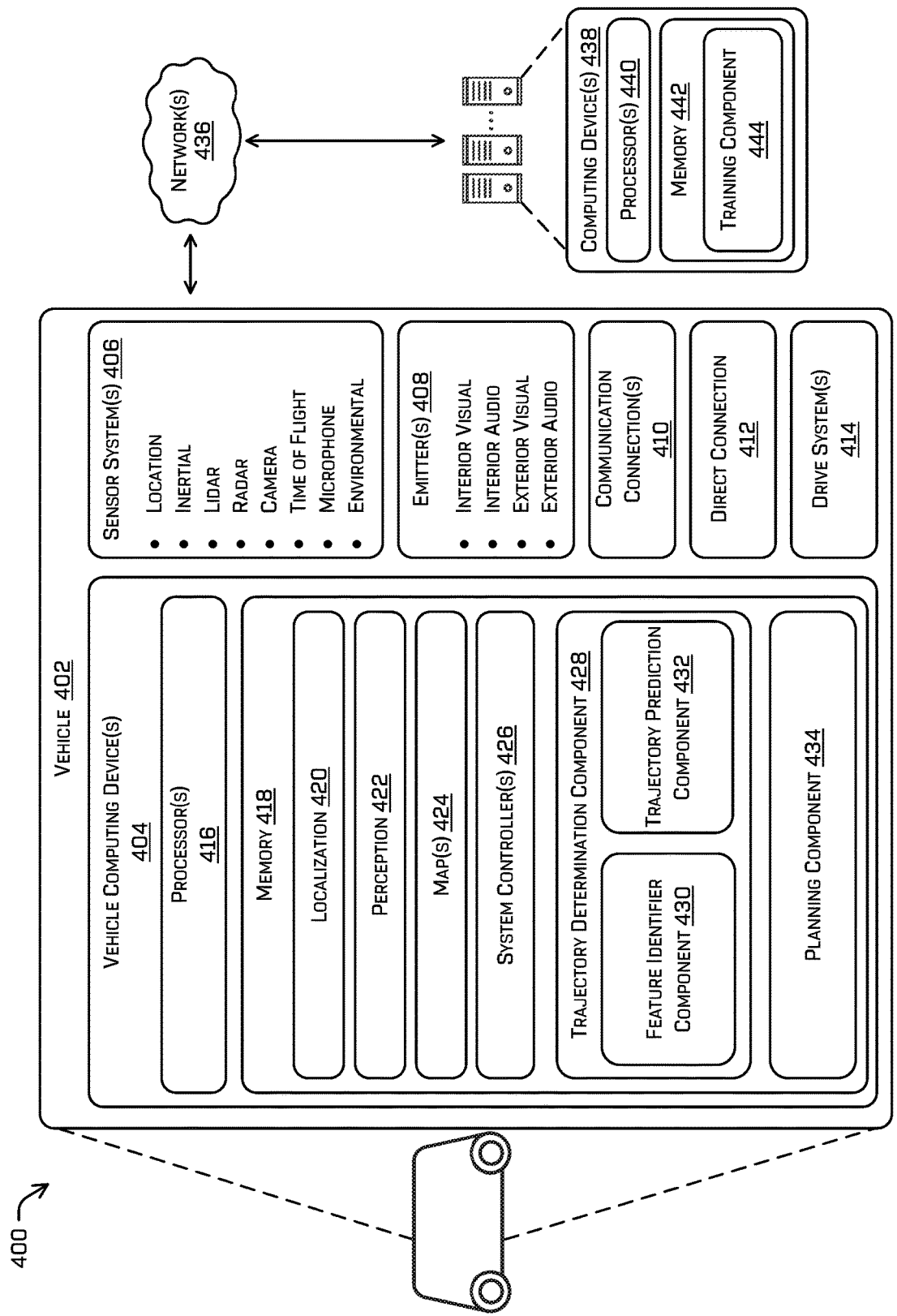
FIG. 4 depicts a block diagram of an example system for implementing the techniques described herein.

FIG. 4 depicts a block diagram of an example system 400 for implementing the techniques described herein. In at least one example, the system 400 can include a vehicle 402, such as an autonomous, semi-autonomous, or manually controlled vehicle.

The vehicle 402 can include vehicle computing device(s) 404, one or more sensor systems 406, one or more emitters 408, one or more communication connections 410, at least one direct connection 412, and one or more drive systems 414.

The vehicle computing device(s) 404 can include one or more processors 416 and memory 418 communicatively coupled with the one or more processors 416. In the illustrated example, the vehicle 402 is an autonomous vehicle; however, the vehicle 402 could be any other type of vehicle or robotic platform. In the illustrated example, the memory 418 of the vehicle computing device(s) 404 stores a localization component 420, a perception component 422, one or more maps 424, one or more system controllers 426, a trajectory determination component 428, a feature identifier component 430, a trajectory prediction component 432, and a planning component 434. Though depicted in FIG. 4 as residing in the memory 418 for illustrative purposes, it is contemplated that the localization component 420, the perception component 422, the one or more maps 424, the one or more system controllers 426, the trajectory determination component 428, the feature identifier component 430, the trajectory prediction component 432, and the planning component 434 can additionally, or alternatively, be accessible to the vehicle 402 (e.g., stored on, or otherwise accessible by, memory remote from the vehicle 402).

In at least one example, the localization component 420 can include functionality to receive data from the sensor system(s) 406 to determine a position and/or orientation of the vehicle 402 (e.g., one or more of an x-, y-, z-position, roll, pitch, or yaw). For example, the localization component 420 can include and/or request/receive a map of an environment and can continuously determine a location and/or orientation of the autonomous vehicle within the map. In some instances, the localization component 420 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 420 can provide data to various components of the vehicle 402 to determine an initial position of an autonomous vehicle for generating a trajectory, for determining to retrieve map data, and so forth, as discussed herein.

In some instances, the perception component 422 can include functionality to perform object detection, segmentation, and/or classification. In some examples, the perception component 422 can provide processed sensor data that indicates a presence of an entity or object that is proximate to the vehicle 402 and/or a classification of the entity as an entity type (e.g., car, wheel, pedestrian, cyclist, animal, building, tree, road surface, curb, sidewalk, stoplight, stop sign, lane marker, vehicle light, unknown, etc.). In additional or alternative examples, the perception component 422 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In those examples in which perception component 422 performs detection, the perception component 422 may output detections of objects and/or features of objects detected in the image. Such detections may comprise two-dimensional bounding boxes (which may subsequently be used to crop the image) and/or masks of the detected object. In some examples, such detection may utilize a machine learning approach (e.g., scale-invariant feature transform (SIFT), histogram of oriented gradients (HOG), etc.) followed by a support vector machine (SVM) to classify objects depicted in images received from a camera of the sensor system(s) 406. Alternatively or additionally, detection may utilize a deep learning approach based on a convolutional neural network (CNN) to classify objects depicted in images received from a camera of the sensor system(s) 406. In examples, the detection may utilize one or more of the object detection techniques (or others) to detect an object depicted in an image, and/or detect a feature of the object depicted in an image, according to the described techniques.

The memory 418 can further include one or more maps 424 that can be used by the vehicle 402 to navigate within the environment, and/or to determine locations of features in the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 424 can include at least one map (e.g., images and/or a mesh). In some examples, the vehicle 402 can be controlled based at least in part on the maps 424. That is, the maps 424 can be used in connection with the localization component 420, the perception component 422, the trajectory determination component 428, or the planning component 434 to determine a location of the vehicle 402, identify objects and/or environmental features in an environment, and/or generate routes and/or trajectories to navigate within an environment.

In some examples, the one or more maps 424 can be stored on a remote computing device(s) (such as the computing device(s) 438) accessible via network(s) 436. In some examples, multiple maps 424 can be stored based on, for example, a characteristic (e.g., type of entity, time of day, day of week, season of the year, etc.). Storing multiple maps 424 can have similar memory requirements, but increase the speed at which data in a map can be accessed. In some examples, the one or more maps 424 can store sizes or dimensions of objects associated with individual locations in an environment. For example, as the vehicle 402 traverses the environment and as maps representing an area proximate to the vehicle 402 are loaded into memory, one or more sizes or dimensions of objects associated with a location can be loaded into memory as well.

In general, the trajectory determination component 428 can determine a vehicle in the environment surrounding the vehicle 402 is in a reverse gear, predict a trajectory of the vehicle based on the determination that the vehicle is in a reverse gear, and generate a trajectory for the vehicle 402 that accommodates the predicted trajectory of the vehicle based on data provided by the sensor system(s) 406. In some instances, the trajectory determination component 428 can provide information generated by the feature identifier component 430 and/or the trajectory prediction component 432 to the planning component 434 to determine when and/or how to control the vehicle 402 to traverse an environment. As discussed herein, the trajectory determination component 428 can receive image data, map data, lidar data, and the like to determine information about objects in an environment.

The feature identifier component 430 can generate, from an image (or cropped image) of a vehicle and information regarding features of the environment from the image or other sensor modalities, an indication of whether the vehicle is in a reverse gear. For instance, the feature identifier component 430 may utilize a machine-learned model trained to classify a lighting state of lights of the vehicle into categories such as a reverse state, a non-reverse state, or an occluded state, to name a few examples. In some examples, the techniques can be performed continuously in an environment to determine a reverse state of an object in an environment, and/or may be associated with a precondition such as a location of the vehicle, a presence of object(s) in the environment, and the like. In some examples, the feature identifier component 430 may output a tag (or flag, additional information, etc.) associated with the vehicle to the planning component 434 indicating that the vehicle is in a reverse state for as long as the lighting state for the light is detected and/or the vehicle is classified as being in a reverse state. Additionally, in some cases, the feature identifier component 430 may output a tag associated with the vehicle to the planning component 434 that the vehicle is in an intending to reverse state, as described herein. In an example where the machine-learned model used by the feature identifier component 430 is a classifier, the machine-learned model may be trained using training image data that is annotated to indicate a ground truth state of a feature (e.g., a lighting state of a light of a vehicle, the vehicle attributes 222, the map data 228, and/or the surrounding vehicle attributes 236 described in relation to FIG. 2). Further, the machine-learned model used by the feature identifier component 430 may be trained using training image data that is annotated to indicate a ground truth state of a direction of travel of vehicles for an amount of time proximate the time that the image was captured or the vehicle is otherwise classified as being in a reverse state or intending to reverse state, such as one second before and/or one second after the time the image was captured, three seconds before and/or after the image was captured, five seconds before and/or after the image was captured, and so forth. In some examples, training data can correspond to the particular implementation of the techniques discussed herein. That is, training data can correspond to the designed input for executing the techniques on vehicle in an environment.

The feature identifier component 430 may identify features of the environment that may be relevant to determining that another vehicle is in a reverse gear, and/or that may be relevant in determining a predicted trajectory of the other vehicle. For instance, the feature identifier component 430 may identify features in the environment such as traffic lanes, parking lanes, bicycle lanes, junctions, and/or sidewalks from map 424, and/or may identify features in the environment such as other vehicles, pedestrians, bicycles, and so forth from sensor data captured by the sensor system(s) 406. These features may be input into the machine-learned model to predict vehicle behavior, such as to provide a reverse indicator associated with the vehicle. In some examples, the feature identifier component 430 can provide information regarding the features of the vehicle relevant to determining that the vehicle is in a reverse gear and/or features of the environment to the planning component 434 to use in controlling the vehicle 402.

The trajectory prediction component 432 can determine, from the indication that a vehicle is in a reverse gear and/or the features of the environment, a predicted trajectory or trajectories that the vehicle may follow to execute a reverse maneuver. For example, the trajectory prediction component 432 may determine, based on an indication that the vehicle is in a reverse gear and features of the environment, that the vehicle is performing a parallel parking maneuver, that the vehicle is backing into a parking space, that the vehicle is backing around a corner or into a driveway, to name a few examples.

In some cases, the trajectory prediction component 432 may receive an indication from the feature identifier component 430 that the vehicle is not currently in a reverse gear, but may determine based on behavior of the vehicle that he vehicle is likely to transition into a reverse gear to execute a maneuver (e.g., in an intending to reverse state), as described above. In some examples, the trajectory prediction component 432 can provide information regarding the predicted trajectory of the vehicle including a reverse maneuver to the planning component 434 to use in controlling the vehicle 402, e.g., to accommodate the reverse maneuver by the vehicle safely and effectively.

In general, the planning component 434 can determine a path for the vehicle 402 to follow to traverse the environment. For example, the planning component 434 can determine various routes and trajectories and various levels of detail, including providing accommodations for other vehicles determined to be likely to execute a reverse maneuver. For example, the planning component 434 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 434 can generate an instruction for guiding the autonomous vehicle along at least a portion of the route from the first location to the second location. In at least one example, the planning component 434 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 402 to navigate.

In some instances, the planning component 434 can generate one or more trajectories for the vehicle 402 based at least in part on determining that a vehicle is executing, or is likely to execute, a reverse maneuver as discussed herein. The planning component 434 may generate one or more trajectories that accommodate a reverse maneuver by another vehicle while continuing along the sequence of waypoints along the route. In some examples, the planning component 434 can use temporal logic, such as linear temporal logic and/or signal temporal logic, to evaluate one or more trajectories of the vehicle 402.

In at least one example, the vehicle computing device(s) 404 can include one or more system controllers 426, which can be configured to control steering, propulsion, braking, safety, emitters, communication, and other systems of the vehicle 402. The system controller(s) 426 can communicate with and/or control corresponding systems of the drive system(s) 414 and/or other components of the vehicle 402.

As can be understood, the components discussed herein (e.g., the localization component 420, the perception component 422, the one or more maps 424, the one or more system controllers 426, the trajectory determination component 428, the feature identifier component 430, the trajectory prediction component 432, and the planning component 434) are described as divided for illustrative purposes. However, the operations performed by the various components can be combined or performed in any other component. By way of example, functions described in relation to the trajectory determination component 428, the feature identifier component 430, and/or the trajectory prediction component 432 may be performed by the perception component 422 to reduce the amount of data transferred by the system.

In at least one example, the sensor system(s) 406 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 can include multiple instances of each of these or other types of sensors. For instance, the lidar sensors can include individual lidar sensors located at the corners, front, back, sides, and/or top of the vehicle 402. As another example, the camera sensors can include multiple cameras disposed at various locations about the exterior and/or interior of the vehicle 402. The sensor system(s) 406 can provide input to the vehicle computing device(s) 404. Additionally or alternatively, the sensor system(s) 406 can send sensor data, via the one or more networks 436, to the one or more computing device(s) at a particular frequency, after a lapse of a predetermined period of time, in near real-time, etc.

The vehicle 402 can also include one or more emitter(s) 408 for emitting light and/or sound, as described above. The emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 can also include one or more communication connection(s) 410 that enable communication between the vehicle 402 and one or more other local or remote computing device(s). For instance, the communication connection(s) 410 can facilitate communication with other local computing device(s) on the vehicle 402 and/or the drive system(s) 414. Also, the communication connection(s) 410 can allow the vehicle to communicate with other nearby computing device(s) (e.g., other nearby vehicles, traffic signals, etc.). The communication connection(s) 410 also enable the vehicle 402 to communicate with a remote teleoperations computing device or other remote services.

The communication connection(s) 410 can include physical and/or logical interfaces for connecting the vehicle computing device(s) 404 to another computing device or a network, such as network(s) 436. For example, the communications connection(s) 410 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 can include one or more drive systems 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor systems to detect conditions of the drive system(s) 414 and/or the surroundings of the vehicle 402. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 414. Furthermore, the drive system(s) 414 also include one or more communication connection(s) that enable communication by the respective drive system with one or more other local or remote computing device(s).

In at least one example, the direct connection 412 can provide a physical interface to couple the one or more drive system(s) 414 with the body of the vehicle 402. For example, the direct connection 412 can allow the transfer of energy, fluids, air, data, etc. between the drive system(s) 414 and the vehicle. In some instances, the direct connection 412 can further releasably secure the drive system(s) 414 to the body of the vehicle 402.

In at least one example, the localization component 420, the perception component 422, the one or more maps 424, the one or more system controllers 426, the trajectory determination component 428, the feature identifier component 430, the trajectory prediction component 432, and the planning component 434 can process sensor data, as described above, and can send their respective outputs, over the one or more networks 436, to one or more computing devices 438. In at least one example, the localization component 420, the perception component 422, the one or more maps 424, the one or more system controllers 426, the trajectory determination component 428, the feature identifier component 430, the trajectory prediction component 432, and the planning component 434 can send their respective outputs to the computing device(s) 438 at a particular frequency, after a lapse of a predetermined period of time, in near real-time, etc.

In some examples, the vehicle 402 can send sensor data to one or more computing devices 438 via the network(s) 436. In some examples, the vehicle 402 can send raw sensor data to the computing device(s) 438. In other examples, the vehicle 402 can send processed sensor data and/or representations of sensor data to the computing device(s) 438. In some examples, the vehicle 402 can send sensor data to the computing device(s) 438 at a particular frequency, after a lapse of a predetermined period of time, in near real-time, etc. In some cases, the vehicle 402 can send sensor data (raw or processed) to the computing device(s) 438 as one or more log files.

The computing device(s) 438 can include processor(s) 440 and a memory 442 storing a training component 444.

In some instances, the training component 444 can include functionality to train one or more models to detect objects and/or features of objects, determine (classify or regress) objects and/or features of objects, determine positions of objects in the environment, and the like. As noted herein, sensor data can be annotated or indicated as representing reversing maneuvers, and such annotated or indicated data can be identified as training data. The training data can be input to a machine learning model where a known result (e.g., a ground truth, such as the known "future" attributes) can be used to adjust weights and/or parameters of the machine learning model to minimize an error.

In some instances, the training component 444 can communicate information generated by the one or more models to the vehicle computing device(s) 404 to revise how to control the vehicle 402 in response to different situations.

For instance, aspects of some or all of the components discussed herein can include any models, algorithms, and/or machine learning algorithms. For example, in some instances, the components in the memory 442 (and the memory 418, discussed above) can be implemented as a neural network. In some examples, the training component 444 can utilize a neural network to generate and/or execute one or more models to improve various aspects of object trajectory estimation for use in trajectory planning of the vehicle 402.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 416 of the vehicle 402 and the processor(s) 440 of the computing device(s) 438 can be any suitable processor capable of executing instructions to process data and perform operations as described herein. By way of example and not limitation, the processor(s) 416 and 440 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 418 and 442 are examples of non-transitory computer-readable media. The memory 418 and 442 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in alternative examples, components of the vehicle 402 can be associated with the computing device(s) 438 and/or components of the computing device(s) 438 can be associated with the vehicle 402. That is, the vehicle 402 can perform one or more of the functions associated with the computing device(s) 438, and vice versa. Further, aspects of the trajectory determination component 428 and/or the planning component 434 can be performed on any of the devices discussed herein.

Figure 5:
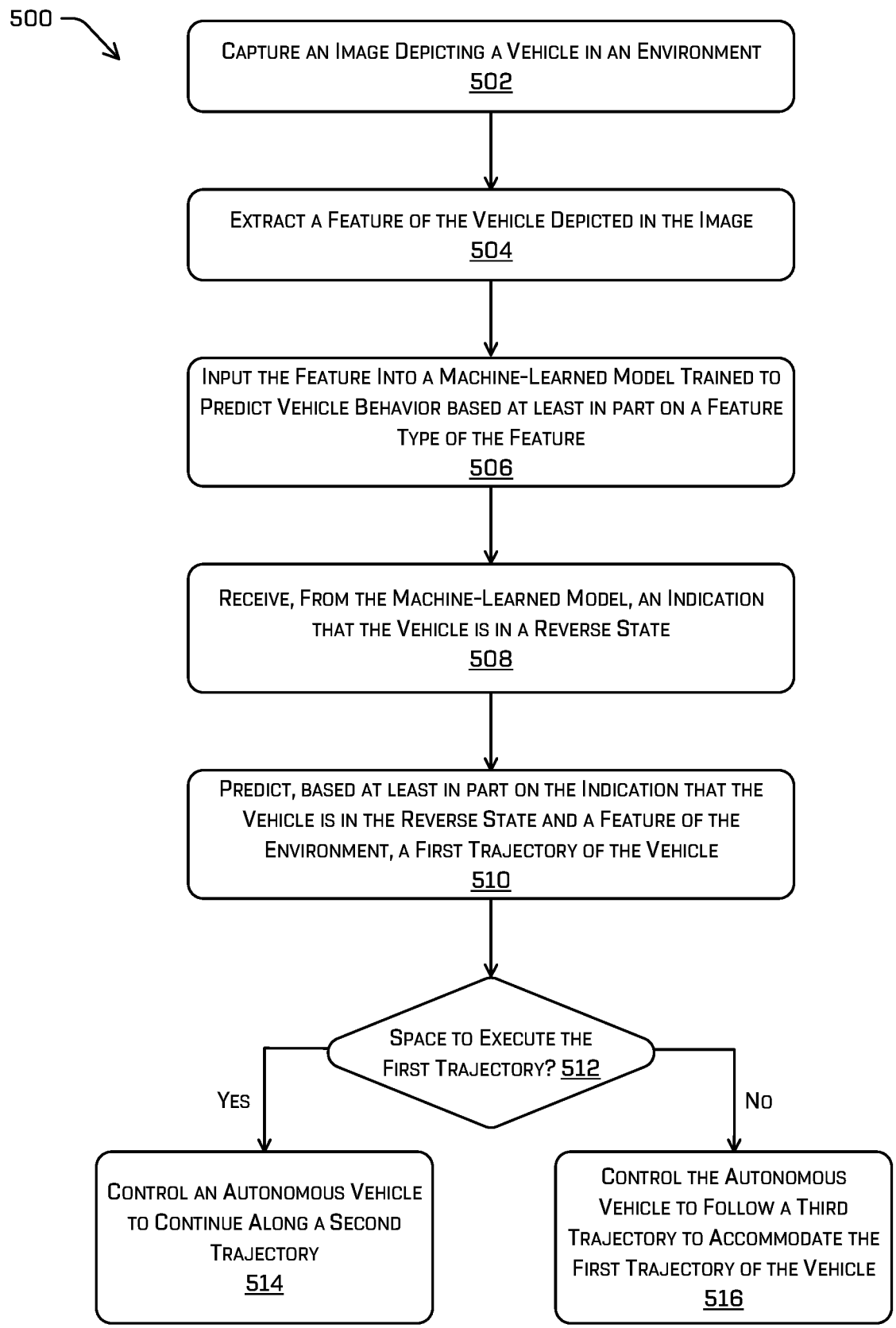
FIG. 5 depicts an example process for determining that a vehicle is associated with a reverse state, predicting a trajectory for the vehicle based on the vehicle being associated with the reverse state, and controlling an autonomous vehicle based on the predicted trajectory, in accordance with examples of the disclosure.

FIG. 5 depicts an example process 500 for determining that a vehicle is in a reverse gear, predicting a trajectory for the vehicle based on the vehicle being in the reverse gear, and controlling an autonomous vehicle based on the predicted trajectory, in accordance with examples of the disclosure. For example, some or all of the process 500 can be performed by one or more components in FIG. 4, as described herein. For example, some or all of the process 500 can be performed by the vehicle computing device(s) 404, the computing device(s) 438, or any other computing device or combination of computing devices. Further, any of the operations described in the example process 500 may be executed in parallel, in a different order than depicted in the process 500, omitted, combined with other processes, and the like.

At operation 502, the process can include capturing an image depicting a vehicle in an environment. For example, the image may be captured by a sensor, such as a camera, of an autonomous vehicle traversing the environment.

At operation 504, the process can include extracting a feature of the vehicle depicted in the image. In some examples, the feature may be a light of the vehicle that indicates that the vehicle is in a reverse gear. The feature, in some cases, may be detected by semantically segmenting the image and labeling a portion of the image that includes the feature. The operation 804 may include cropping a portion of the image that includes the feature for further analysis. While a feature of the vehicle is described in reference to the process 500, it should be understood that other features may be used to predict vehicle behavior, such as any of the vehicle attributes 222, the map data 228, and/or the surrounding vehicle attributes 236 described in relation to FIG. 2.

At operation 506, the process can include inputting the feature into a machine-learned model trained to predict vehicle behavior based at least in part on a feature type of the feature. For example, the machine-learned model may be a classifier trained to classify a reverse state of the vehicle into one or more of a reverse state, a non-reverse state, or an intending to reverse state, to name a few classification examples. The machine-learned model may alternatively or additionally be trained to predict vehicle behavior based on auditory signals or environmental features, for instance, which may indicate that a vehicle is in a reverse gear.

At operation 508, the process can include receiving, from the machine-learned model, an indication that the vehicle is in a reverse state. In some cases, the machine-learned model may output a tag for a duration corresponding to the length of time the lighting state of the light indicates that the vehicle is in a reverse state.

At operation 510, the process can include predicting, based at least in part on the indication that the vehicle is in the reverse state and a feature of the environment, a first trajectory of the vehicle. For instance, a variety of features may be analyzed to determine a predicted trajectory of the vehicle, such as an orientation of the vehicle (e.g., relative to a lane of traffic), a velocity of the vehicle relative to a speed limit at a location of the vehicle in the environment, a velocity of the vehicle relative to other vehicles in the surrounding environment, a particular lane that the vehicle is currently in, a lane neighboring the lane that the vehicle is currently in (e.g., a neighboring parking lane, driveway, etc.), whether the vehicle is located at or near a junction, distances between the vehicle and other vehicles in the environment, velocities of other vehicles near the vehicle, and so forth. While the operation 510 is generally described herein as being performed following the operation 508, the operation 510, in some cases may be combined with the operation 508 such that a predicted trajectory for the vehicle is generated by, and is also received from the machine-learned model.

At operation 512, the process can include a determination as to whether there is space to execute the first trajectory, such as if an autonomous vehicle continues along a current trajectory. For example, an autonomous vehicle may proceed along a current trajectory and stop behind a vehicle as though the vehicles were stopping at a stop light, such as by providing a half car length between the autonomous vehicle and the vehicle. However, such a distance as provided by the current trajectory (e.g., half a car length) may not sufficiently accommodate allowing the vehicle to execute a reverse maneuver, such as to parallel park or to back into a parking space.

If there is sufficient space to execute the first trajectory, the process can include an operation 514 in which the autonomous vehicle is controlled to continue along a second trajectory (e.g., a current trajectory of the autonomous vehicle). For example, an autonomous vehicle may receive an indication that another vehicle is predicted to execute a reverse maneuver, but a current trajectory, e.g., along a lane of traffic unimpeded by the predicted reverse maneuver, may provide sufficient space for the other vehicle to execute the reverse maneuver. Therefore, the autonomous vehicle may be controlled to continue along the current trajectory.

However, if there is not sufficient space for the vehicle to execute the first trajectory, the process can include an operation 516 in which the autonomous vehicle is controlled to follow a third trajectory to accommodate the first trajectory of the vehicle. As described above, the third trajectory determined to accommodate the first trajectory of the vehicle may include maintaining a current position such as by stopping the autonomous vehicle. Alternatively or additionally, the third trajectory determined to accommodate the first trajectory of the vehicle may include controlling the autonomous vehicle to follow a trajectory that continues along a route to an intended destination of the autonomous vehicle but circumvents the predicted trajectory of the vehicle executing the reverse maneuver.

EXAMPLE CLAUSES

A: A system comprising: one or more processors; and one or more computer-readable media storing instructions executable by the one or more processors, wherein the instructions, when executed, cause the system to perform operations comprising: capturing image data of an environment using an image sensor on an autonomous vehicle; determining that the image data represents a vehicle in the environment; determining a first feature associated with the vehicle, the first feature being of a feature type that indicates whether the vehicle is associated with a reverse state; inputting the first feature into a machine-learned model trained to predict vehicle behavior based at least in part on the feature type; receiving, from the machine-learned model, an indication that the vehicle is associated with the reverse state; predicting, based at least in part on the indication that the vehicle is associated with the reverse state and a second feature of the environment determined from map data, a trajectory of the vehicle; and controlling the autonomous vehicle based at least in part on the trajectory of the vehicle to provide the vehicle with space to execute the trajectory.

B: The system of paragraph A, wherein the feature type is indicative of a light associated with vehicles, and wherein the machine-learned model is trained using training image data annotated to indicate: a ground truth state of a lighting state of the light at a time that the training image data is captured; and a direction of travel of a training vehicle of the vehicles for an amount of time proximate the time that the training image data was captured.

C: The system of paragraph A, wherein the vehicle is a first vehicle, the operations further comprising: determining a first velocity of the first vehicle; and determining a first difference between the first velocity of the first vehicle and a speed limit at a location of the first vehicle in the environment; or a second difference between the first velocity of the first vehicle and a second velocity of a second vehicle in the environment, wherein the machine-learned model is further trained to predict the vehicle behavior based at least in part on differences in vehicle speeds, and one or more of the first difference or the second difference are input into the machine-learned model.

D: The system of paragraph A, wherein the trajectory is a first trajectory, and wherein controlling the autonomous vehicle comprises: determining a width associated with the vehicle; associating the width with a length of the first trajectory; and determining a second trajectory for the autonomous vehicle to traverse the environment such that the autonomous vehicle circumnavigates the width along the length of the first trajectory.

E: The system of paragraph A, wherein controlling the autonomous vehicle comprises maintaining a position of the autonomous vehicle for a duration of time associated with the vehicle executing the trajectory.

F: A method comprising: receiving sensor data captured by a sensor in an environment; determining that the sensor data represents a vehicle; determining a feature associated with the vehicle, the feature being of a feature type that indicates whether the vehicle is associated with a reverse state; inputting the feature into a machine-learned model trained to predict vehicle behavior based at least in part on the feature type; receiving, from the machine-learned model, an indication that the vehicle is associated with the reverse state; and predicting, based at least in part on the indication that the vehicle is associated with the reverse state, a trajectory associated with the vehicle.

G: The method of paragraph F, wherein the indication that the vehicle is associated with the reverse state comprises an angle of the vehicle relative to a second feature of the environment, wherein predicting the trajectory of the vehicle is further based at least in part on the angle of the vehicle relative to the second feature.

H: The method of paragraph F, wherein predicting the trajectory of the vehicle comprises determining that the vehicle is preparing to parallel park, the method further comprising: controlling an autonomous vehicle to: maintain a stopped position for a duration of the vehicle parallel parking; or enter a traffic lane to traverse around the vehicle in the environment.

I: The method of paragraph F, further comprising: determining a region proximate the vehicle that the vehicle is permitted to reverse into, wherein predicting the trajectory is further based on a location of the region relative to the vehicle.

J: The method of paragraph I, wherein the region comprises one or more of: a lane of traffic; a parking space; or a driveway.

K: The method of paragraph I, further comprising: determining that the vehicle is at a location within a threshold distance of the region; determining a first velocity of the vehicle at the location; and determining a difference between the first velocity of the vehicle and one or more of a second velocity of another vehicle or a speed limit associated with the location, wherein the machine-learned model is further trained to predict vehicle behavior based at least in part on environmental features, and one or more of the location, the first velocity, and the difference are input into the machine-learned model.

L: The method of paragraph F, wherein the feature is indicative of a light associated with the vehicle, wherein the machine-learned model comprises a classifier trained to classify a reversing state of the vehicle into one or more of: a reverse state; a non-reverse state; or an intending to reverse state.

M: One or more computer-readable media storing instructions that when executed by one or more processors perform operations comprising: receiving sensor data captured by a sensor in an environment; determining that the sensor data represents a vehicle; determining a feature associated with the vehicle, the feature being of a feature type that indicates whether the vehicle is associated with a reverse state; inputting the feature into a machine-learned model trained to predict vehicle behavior based at least in part on the feature type; receiving, from the machine-learned model, an indication that the vehicle associated with the reverse state; predicting, based at least in part on the indication that the vehicle is associated with the reverse state, a trajectory associated with the vehicle; and determining, based at least in part on the reverse state, a maneuver for an autonomous vehicle to perform.

N: The one or more computer-readable media of paragraph M, the operations further comprising: determining a width associated with the vehicle; and associating the width with a length of the trajectory; wherein the maneuver is associated with the autonomous vehicle circumnavigating at least the width along the length of the trajectory.

O: The one or more computer-readable media of paragraph M, wherein the maneuver comprises: controlling the autonomous vehicle to maintain a current position of the autonomous vehicle for a duration of time associated with the vehicle executing the trajectory.

P: The one or more computer-readable media of paragraph M, wherein the feature is a first feature, the operations further comprising: determining an angle of the vehicle relative to a second feature of the environment, wherein the machine-learned model is further trained to predict the vehicle behavior based at least in part on environmental features and one or more of the angle or the second feature are input into the machine-learned model.

Q: The one or more computer-readable media of paragraph M, the operations further comprising: determining a region proximate the vehicle that the vehicle is permitted to reverse into, wherein predicting the trajectory is further based on a location of the region relative to the vehicle.

R: The one or more computer-readable media of paragraph Q, wherein the region comprises one or more of: a lane of traffic; a parking space; or a driveway.

S: The one or more computer-readable media of paragraph Q, the operations further comprising: determining that the vehicle is located within a threshold distance of the region; determining a first velocity of the vehicle at the location; and determining a difference between the first velocity of the vehicle and one or more of a second velocity of another vehicle or a speed limit associated with the location, wherein the machine-learned model is further trained to predict vehicle behavior based at least in part on environmental features, and one or more of the location, the first velocity, and the difference are input into the machine-learned model.

T: The one or more computer-readable media of paragraph M, wherein the feature is indicative of a light associated with the vehicle, wherein the machine-learned model comprises a classifier trained to classify a reversing state of the vehicle into one or more of: a reverse state; a non-reverse state; or an intending to reverse state.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While individual examples are described herein as having certain features or components, the features and components of the individual examples can be combined and used together. While the operations herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:
1. A system comprising:
one or more processors; and
one or more computer-readable media storing instructions executable by the one or more processors, wherein the instructions, when executed, cause the system to perform operations comprising:
 capturing image data of an environment using an image sensor on an autonomous vehicle;
 determining that the image data represents a vehicle moving along a lane in the environment;
 determining, from the image data, features associated with the vehicle, the features including a first feature being indicative of a vehicle reverse light state and a second feature being indicative of an angle of the vehicle relative to the lane;
 determining, from the image data, a first velocity of the vehicle;
 determining a first difference between the first velocity of the vehicle and a speed limit at a location of the vehicle in the environment;
 inputting the first feature, the second feature, and the first difference into a machine-learned model trained to predict vehicle behavior based at least in part on the first feature, the second feature, and the first difference;

receiving, from the machine-learned model, an indication that the vehicle is associated with a reverse state, the reverse state indicating that the vehicle is likely to reverse prior to a reverse motion being detected;

predicting, based at least in part on the indication that the vehicle is associated with the reverse state and a third feature of the environment determined from map data, a trajectory of the vehicle; and controlling the autonomous vehicle based at least in part on the trajectory of the vehicle to provide the vehicle with space to execute the trajectory.

2. The system of claim 1, wherein the machine-learned model is trained using training image data annotated to indicate:

a ground truth state of a lighting state of a vehicle reverse light at a time that the training image data is captured; and a direction of travel of a training vehicle associated with the vehicle reverse light for an amount of time proximate the time that the training image data was captured.

3. The system of claim 1, wherein the vehicle is a first vehicle, the operations further comprising:

determining a second difference between the first velocity of the first vehicle and a second velocity of a second vehicle in the environment, wherein the machine-learned model is further trained to predict the vehicle behavior based at least in part on the second difference, and the second difference is input into the machine-learned model.

4. The system of claim 1, wherein controlling the autonomous vehicle comprises maintaining a position of the autonomous vehicle for a duration of time associated with the vehicle executing the trajectory.

5. The system of claim 1, wherein predicting the trajectory of the vehicle comprises determining that the vehicle is preparing to parallel park, and wherein controlling the autonomous vehicle comprises:

maintaining a stopped position for a duration of the vehicle to parallel park; or entering a traffic lane to traverse around the vehicle in the environment.

6. The system of claim 1, wherein the operations further comprise:

determining a region proximate the vehicle that the vehicle is permitted to reverse into, wherein predicting the trajectory is further based on a location of the region relative to the vehicle.

7. The system of claim 6, wherein the region comprises one or more of:

a lane of traffic;

a parking space; or a driveway.

8. The system of claim 1, wherein the operations further comprise:

determining, from the image data, a fourth feature being indicative of a second angle of the vehicle relative to a parking lane; and inputting the first feature and at least one of the second feature or the fourth feature into a machine-learned model trained to predict vehicle behavior based at least in part on the first feature and at least one of the second feature or the fourth feature.

9. A method comprising:

receiving sensor data captured by a sensor in an environment;

determining that the sensor data represents a vehicle moving along a lane in the environment;

determining a feature associated with the vehicle, the feature being indicative of a vehicle reverse light state associated with the vehicle;

determining a first velocity of the vehicle at a first location;

determining a first difference between the first velocity of the vehicle and a speed limit associated with the first location;

inputting the feature and the first difference into a machine-learned model trained to predict vehicle behavior based at least in part on the feature and the first difference, wherein the machine-learned model is trained using training image data annotated to indicate:

a ground truth state of a lighting state of a vehicle reverse light at a time that the training image data is captured; and a direction of travel of a training vehicle depicted in the training image data for an amount of time proximate the time that the training image data was captured;

receiving, from the machine-learned model, an indication that the vehicle is associated with a reverse state, the reverse state indicating that the vehicle is stopped prior to a reverse motion being detected;

predicting, based at least in part on the indication that the vehicle is associated with the reverse state, a trajectory associated with the vehicle; and controlling an autonomous vehicle, based at least in part on the trajectory of the vehicle, to perform a maneuver to provide the vehicle with space to execute the trajectory.

10. The method of claim 9, further comprising:

determining a third feature being indicative of a second angle of the vehicle relative to a parking lane, wherein predicting the trajectory of the vehicle is further based at least in part on the third feature.

11. The method of claim 9, further comprising:

determining a second feature being indicative of an angle of the vehicle relative to the lane, wherein predicting the trajectory of the vehicle is further based at least in part on the angle of the vehicle relative to the lane.

12. The method of claim 9, wherein predicting the trajectory of the vehicle comprises determining that the vehicle is preparing to parallel park, and wherein the maneuver comprises:

maintaining a stopped position for a duration of the vehicle to parallel park; or entering a traffic lane to traverse around the vehicle in the environment.

13. The method of claim 9, further comprising:

determining a region proximate the vehicle that the vehicle is permitted to reverse into, wherein predicting the trajectory is further based on a second location of the region relative to the vehicle.

14. The method of claim 13, wherein the region comprises one or more of:

a lane of traffic;

a parking space; or a driveway.

15. The method of claim 13, wherein, the method further comprising:

determining a second difference between the first velocity of the vehicle and one or more of a second velocity of another, wherein the machine-learned model is further trained to predict vehicle behavior based at least in part on environmental features, and one or more of the first location, the second location, the first velocity, and the second difference are input into the machine-learned model.

16. One or more non-transitory computer-readable media storing instructions that when executed by one or more processors perform operations comprising:
receiving sensor data captured by a sensor in an environment;
determining that the sensor data represents a vehicle moving along a lane in the environment;
determining a feature associated with the vehicle, the feature indicating an angle of the vehicle relative to the lane;
determining a first velocity of the vehicle at a first location;
determining a first difference between the first velocity of the vehicle and a speed limit associated with the first location;
inputting the feature indicating the angle of the vehicle relative to the lane and the first difference into a machine-learned model trained to predict vehicle behavior based at least in part on the feature and the first difference;
receiving, from the machine-learned model, an indication that the vehicle is associated with a reverse state based at least in part on the feature indicating the angle of the vehicle relative to the lane, the reverse state indicating that the vehicle is stopped prior to a reverse motion being detected;
predicting, based at least in part on the indication that the vehicle is associated with the reverse state, a trajectory associated with the vehicle; and
controlling an autonomous vehicle, based at least in part on the trajectory of the vehicle, to perform a maneuver to provide the vehicle with space to execute the trajectory.

17. The one or more non-transitory computer-readable media of claim 16, wherein the maneuver comprises:
controlling the autonomous vehicle to maintain a current position of the autonomous vehicle for a duration of time associated with the vehicle executing the trajectory.

18. The one or more non-transitory computer-readable media of claim 16, the operations further comprising:
determining a region proximate the vehicle that the vehicle is permitted to reverse into,
wherein predicting the trajectory is further based on a second location of the region relative to the vehicle.

19. The one or more non-transitory computer-readable media of claim 18, wherein the region comprises one or more of:
a lane of traffic;
a parking space; or
a driveway.

20. The one or more non-transitory computer-readable media of claim 18, the operations further comprising:
determining a second difference between the first velocity of the vehicle and one or more of a second velocity of another vehicle,
wherein the machine-learned model is further trained to predict vehicle behavior based at least in part on environmental features, and one or more of the first location, the second location, the first velocity, and the second difference are input into the machine-learned model.

21. The one or more non-transitory computer-readable media of claim 16, wherein:
the feature is a first feature;
the operations further comprise determining a second feature associated with the vehicle, the second feature being indicative of a light associated with the vehicle; and
the machine-learned model comprises a classifier trained to classify a reversing state of the vehicle into one or more of:
a reverse state;
a non-reverse state; or
an intending to reverse state.

* * * * *